(12) United States Patent
Horihata et al.

(10) Patent No.: US 12,354,417 B2
(45) Date of Patent: Jul. 8, 2025

(54) VEHICLE DATA ANALYSIS METHOD AND DEVICE

(71) Applicant: Nissan Motor Co., Ltd., Kanagawa (JP)

(72) Inventors: Yuki Horihata, Kanagawa (JP); Toru Takagi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 18/850,962

(22) PCT Filed: Mar. 28, 2022

(86) PCT No.: PCT/JP2022/014781
§ 371 (c)(1),
(2) Date: Sep. 25, 2024

(87) PCT Pub. No.: WO2023/187851
PCT Pub. Date: Oct. 5, 2023

(65) Prior Publication Data
US 2025/0111706 A1 Apr. 3, 2025

(51) Int. Cl.
*G07C 5/00* (2006.01)
*G01L 5/24* (2006.01)
(Continued)

(52) U.S. Cl.
CPC .............. *G07C 5/008* (2013.01); *G01L 5/24* (2013.01); *G06Q 40/08* (2013.01); *G07C 5/04* (2013.01); *G07C 5/06* (2013.01)

(58) Field of Classification Search
CPC .......... G07C 5/008; G07C 5/00; G08B 21/06; G06Q 40/08; G06Q 20/4015; G06N 20/00;
(Continued)

(56) References Cited

U.S. PATENT DOCUMENTS 9,792,656 B1 * 10/2017 Konrardy ............... G08B 21/06
10,222,228 B1 * 3/2019 Chan ..................... G06F 3/0481
(Continued)

FOREIGN PATENT DOCUMENTS

CN 111127228 A 5/2020
JP H10132585 A 5/1998
(Continued)

*Primary Examiner* — Yuri Kan
(74) *Attorney, Agent, or Firm* — Osha Bergman Watanabe & Burton LLP

(57) ABSTRACT

Vehicle data is acquired, and is linked with each vehicle component, first degree of abnormality is determined for each vehicle component. When detecting collision, vehicle data is acquired during self-travelling after the collision. If vehicle is not capable of self-travelling, by referring to post-collision vehicle data etc., second degree of abnormality after the collision is calculated. The first and second degrees of abnormality are compared, if the second degree of abnormality is greater than the first degree of abnormality by a predetermined value or more, vehicle component is identified as vehicle component which is outside an impact area, but has been affected in terms of deterioration etc., and necessary information is displayed. When there is an intentional driving characteristic change after the collision, vehicle component is not identified as vehicle component having been affected in terms of deterioration etc.

31 Claims, 11 Drawing Sheets

(51) Int. Cl.
  *G06Q 40/08* (2012.01)
  *G07C 5/04* (2006.01)
  *G07C 5/06* (2006.01)
(58) Field of Classification Search
  CPC .. B60W 50/0205; H04L 63/126; G06F 30/20; G06F 3/0481; G06T 11/60
  See application file for complete search history.

(56) References Cited

U.S. PATENT DOCUMENTS

| | | | |
|---|---|---|---|
| 10,909,628 B1* | 2/2021 | Tofte | G06T 11/60 |
| 11,062,395 B1* | 7/2021 | Konrardy | G06F 30/20 |
| 2019/0384870 A1 | 12/2019 | Shiraishi et al. | |
| 2020/0334928 A1 | 10/2020 | Bourke et al. | |
| 2021/0304317 A1* | 9/2021 | Leise | H04L 63/126 |
| 2021/0312559 A1* | 10/2021 | Leise | B60W 50/0205 |
| 2021/0342946 A1* | 11/2021 | Leise | G06Q 20/4015 |
| 2022/0270180 A1* | 8/2022 | Leise | G06N 20/00 |
| 2022/0405857 A1* | 12/2022 | Leise | G06Q 40/08 |

FOREIGN PATENT DOCUMENTS

| | | |
|---|---|---|
| JP | 2006346784 A | 12/2006 |
| JP | 4915096 B2 | 4/2012 |
| JP | 2019018842 A | 2/2019 |
| JP | 2020013557 A | 1/2020 |
| JP | 2020064605 A | 4/2020 |
| JP | 2020190421 A | 11/2020 |
| JP | 2021503678 A | 2/2021 |
| KR | 102109882 B1 | 5/2020 |

* cited by examiner

VEHICLE DATA ANALYSIS METHOD AND DEVICE

TECHNICAL FIELD

The present invention relates to a vehicle data analysis technique for appropriately evaluating damage to a vehicle component due to collision of a vehicle, in particular damage to a vehicle component that is considered to have no relationship with the collision at first glance.

BACKGROUND ART

In a case where a vehicle collides with other vehicle(s) or a structure during travel, a vehicle component which is positioned at a collision area or its vicinity and which has been deformed or damaged due to collision energy is identified at a repair shop, and its replacement or repair is performed. Then, in many cases, its cost is covered by insurance under a contract with an insurance company.

However, even a vehicle component that appears to have no relationship with the collision at first glance may be adversely affected in the form of progress of deterioration or shortening of future lifespan. In such cases, a vehicle owner himself/herself is also often unaware of the problem, and a dispute on whether these progress of deterioration of the vehicle component and shortening of future lifespan of the vehicle component are caused by the collision, i.e. by an accident, tends to arise between the parties.

Patent Document 1 discloses a technique of performing analysis of an accident upon a vehicle collision using telematics data including data of a gyroscope, an accelerometer, GPS data, video recording, vehicle diagnostic data, voice recording, etc. Further, whether a vehicle component in an impact area has been damaged is identified from the telematics data, and a repair cost is estimated.

Such technique cannot analyze an influent on a vehicle component positioned outside the impact area.

Patent Document 2 discloses a technique of generating digital twin of a vehicle in order to grasp a vehicle condition in real time, of performing simulation based on this digital twin, and of monitoring, for instance, a service life of the vehicle. When detecting an accident, an ancient event data is recorded, and a current vehicle value is updated.

In this Patent Document 2, the ancient event data is merely recorded. Therefore, Patent Document 2 cannot analyze whether a vehicle component that is considered to have no relationship with the collision at first glance has been affected in terms of deterioration by the collision.

CITATION LIST

Patent Document

Patent Document 1: Japanese Unexamined Patent Application Publication (Translation of PCT Application) No. JP2021-503678

Patent Document 2: Japanese Unexamined Patent Application Publication No. JP2020-013557

SUMMARY OF THE INVENTION

A vehicle data analysis method according to the present invention comprises: acquiring data of a vehicle component during travel before a collision, and determining, based on this data, a degree of abnormality of the vehicle component as a first degree of abnormality; detecting a collision of a vehicle; determining a degree of abnormality of the vehicle component after the collision as a second degree of abnormality; and comparing the first degree of abnormality and the second degree of abnormality.

In this manner, by comparing the first degree of abnormality before the collision and the second degree of abnormality after the collision, regardless of a positional relationship between a collision area (the impact area) and the vehicle component, the presence or absence of deformation of the vehicle component, etc., it is possible to evaluate adverse effect such as deterioration of the vehicle component due to the collision.

As a preferable aspect of the present invention, when a difference between the first degree of abnormality and the second degree of abnormality is a predetermined threshold value or greater, the vehicle component is considered as a vehicle component affected by the collision, and information on the vehicle component is output.

As a preferable aspect of the present invention, data of the vehicle component after the collision is acquired during self-travelling of the vehicle after the collision, and based on this data, the second degree of abnormality is determined.

That is, when the vehicle is capable of self-travelling even after the collision, data is acquired by and during the self-travelling, and the second degree of abnormality can be determined.

As another preferable aspect of the present invention, the second degree of abnormality is estimated by the data of the vehicle component before the collision or learning of collision data of other vehicles.

Therefore, even when the self-travelling is impossible due to the collision, by the comparison between the first degree of abnormality and the second degree of abnormality, influence on the vehicle component can be estimated.

For instance, information about the collision is acquired, and based on this information, a group of similar collision data of the other vehicles is selected. By estimating the degree of abnormality using the data group having similar collision state or condition and/or similar characteristics (such as vehicle type or vehicle model, production time, production factory) of an accident vehicle, accuracy of the degree of abnormality is increased.

As a preferable aspect of the present invention, the comparison between the first degree of abnormality and the second degree of abnormality is performed for each of a plurality of vehicle components.

As a preferable aspect of the present invention, the first degree of abnormality and the second degree of abnormality are corrected by vehicle position data, weather data and driving characteristic data of a driver. That is, it is preferable to suppress change in the first degree of abnormality and the second degree of abnormality due to external factors.

Further, as a preferable aspect of the present invention, driving characteristic data of a driver immediately before the collision and driving characteristic data of the driver after the collision are acquired, and when it is judged that there is an intentional driving characteristic change, the comparison between the first degree of abnormality and the second degree of abnormality or output of information on the vehicle component is not performed.

For instance, in a case where the user has an insurance contract to cover an accident, it is also conceivable that the driver will drive so as to intentionally accelerate deterioration (e.g. drift driving, travelling with sudden acceleration and/or sudden braking, etc.). If such intentional driving exists, the comparison of the degree of abnormality or the output of information on the vehicle component is not performed.

In addition, as one aspect of the present invention, data of a fastening torque of a fastening member that fixes the vehicle component is acquired, and a fastening torque after the collision is compared with a reference value. With this, it is possible to know the presence of the fastening member that has loosened due to the collision.

For instance, when the fastening torque after the collision is the reference value or less, a request for inspection may be transmitted to a vehicle repair depot. With this, prompt action can be possible.

Further, as an example, when a difference between the first degree of abnormality and the second degree of abnormality is a predetermined threshold value or greater, the vehicle component is included in candidates for insurance claim, and when the fastening torque after the collision is the reference value or less, the vehicle component is excluded from the candidates for insurance claim.

That is, even if the degree of abnormality is large after the collision, there is a possibility that the abnormality can be resolved by retightening the fastening member. Therefore, the vehicle component is excluded from the candidates for insurance claim.

Preferably, when the fastening torque after the collision is the reference value or less, a notification that a user of the vehicle refrains from travelling and has the vehicle inspected is given to the user. With this, travelling with the fastening member still loosening can be suppressed.

Further, as one aspect of the present invention, information about entry of foreign matter into the vehicle component due to the collision is acquired.

Preferably, when the entry of the foreign matter into the vehicle component is detected, a request for inspection is transmitted to a vehicle repair depot.

Further, as an example, when a difference between the first degree of abnormality and the second degree of abnormality is a predetermined threshold value or greater, the vehicle component is included in candidates for insurance claim, and when the entry of the foreign matter into the vehicle component is detected, the vehicle component is excluded from the candidates for insurance claim.

That is, even if the degree of abnormality is large after the collision, there is a possibility that the abnormality can be resolved by removing the foreign matter. Therefore, the vehicle component is excluded from the candidates for insurance claim.

Preferably, when the entry of the foreign matter into the vehicle component is detected, a notification that a user of the vehicle refrains from travelling and has the vehicle inspected is given to the user. With this, travelling with the foreign matter still present can be suppressed.

As a preferable aspect of the present invention, when the collision is detected, data at a time of the collision, information about conditions of an intended vehicle component before and after the collision and data that is a source of calculation of the second degree of abnormality are transmitted to at least any of a party concerned in insurance, a police official and a legal representative.

As a preferable aspect of the present invention, a difference between the first degree of abnormality and the second degree of abnormality is determined for a plurality of vehicle components, and the components are displayed in order of the largest difference on a display unit.

With this, it is possible to easily grasp the vehicle component that has been relatively more greatly affected by the collision.

Further, as a preferable aspect of the present invention, a vehicle component whose difference between the first degree of abnormality and the second degree of abnormality is a predetermined threshold value or greater is extracted from among a plurality of vehicle Components, information about the collision is acquired, and based on this information, a vehicle component on which collision energy would have been directly exerted and a vehicle component on which the collision energy would have been indirectly exerted are classified, and the both components are displayed separately on a display unit.

With this, the user etc. can easily understand the influence of the collision.

Further, as a preferable aspect of the present invention, an appropriate maintenance course for a vehicle component whose difference between the first degree of abnormality and the second degree of abnormality is a predetermined threshold value or greater is determined, an approximate repair price is calculated along this maintenance course, and these maintenance course and approximate repair price are displayed on a display unit.

Furthermore, as a preferable aspect of the present invention, driving characteristic data of a driver immediately before the collision and driving characteristic data of the driver after the collision are acquired, and when it is judged that there is an intentional driving characteristic change, a corresponding travel section is displayed on a display unit.

With this, for instance, when reckless driving is intentionally done after the collision, the insurance company etc. can easily grasp it.

A vehicle data analysis device comprises: a data acquisition unit configured to acquire data that is a source of calculation of a degree of abnormality of a vehicle component; a collision detection unit configured to detect a collision of a vehicle; an abnormality degree calculation unit configured to, for an intended vehicle component, based on data acquired during travel before the collision, determine a first degree of abnormality and also determine a second degree of abnormality after the collision; and a comparison unit configured to compare the first degree of abnormality and the second degree of abnormality.

EMBODIMENTS FOR CARRYING OUT THE INVENTION

Embodiments of the present invention will be described in detail below. In the following embodiments, as an example, the present invention is applied to an accident handling support system (or an accident processing support system) including insurance claim in the event of an accident (collision), which is provided as a type of service by an insurance company, an automobile sales company (so-called dealer) and so on to a user (such as an automobile insurance contractor and a vehicle purchaser), An entire data analysis device in each embodiment is configured as a cloud system mainly composed of a cloud server and managed by, for instance, the insurance company, the automobile sales company and so on, and may include a portable device such as a smartphone and/or a personal computer that are owned by a user, a plurality of data acquisition devices pre-installed in a vehicle so as to acquire various data from the vehicle side, a vehicle-mounted computer system and an on-vehicle display, a terminal of the dealer, a terminal of the insurance company, etc.

Figure 1:
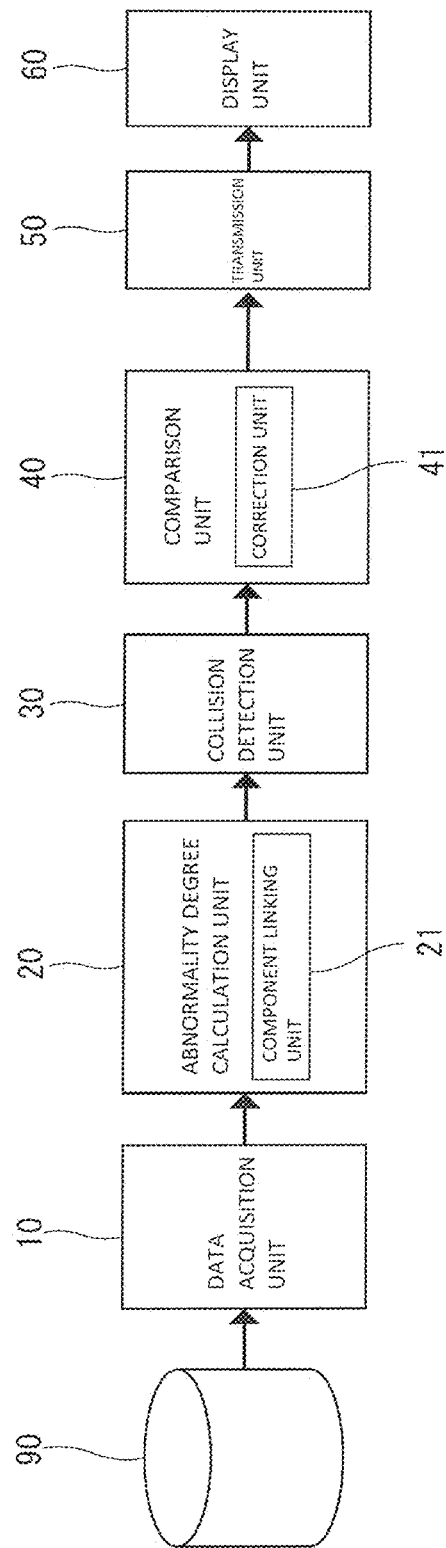
FIG. 1 is a functional block diagram of a data analysis device according to a first embodiment.

FIG. 1 is a functional block diagram of a data analysis device according to a first embodiment. This data analysis device has a data acquisition unit 10, an abnormality degree calculation unit 20, a collision detection unit 30, a comparison unit 40, a transmission unit 50 and a display unit 60.

The data acquisition unit 10 acquires a large number of vehicle data from the data acquisition devices etc. of the vehicle during vehicle travel. The vehicle data is, for instance, time-series data related to engine control such as an engine rotation speed and an engine temperature, data indicating a degree of wear of suspensions, tires, etc. In addition, various data could be an object of acquisition in accordance with target vehicle components or functional components (or intended vehicle components or functional components). It is noted that the vehicle data may be time-series data continuously acquired from the past, or may be an instantaneous value such as a current value. Further, the vehicle data may be not only values acquired from vehicle-mounted devices and vehicle signal measurement devices, but also values acquired from devices other than the vehicle-mounted devices such as values measured in the dealer and past measurement records kept in the dealer. Although these are comprehensively illustrated as a vehicle information database 90 in FIG. 1, information such as the engine rotation speed, which is sequentially provided from the vehicle side, is also included in the vehicle information database 90. For instance, data detected by the device on the vehicle side is output to the cloud server managed by, for instance, the insurance company etc. via a connected car system or an appropriate communication means. A type of information to be acquired as the vehicle data and a type of means to be used are arbitrary.

Further, as described later, a large number of past accident data and accident simulation data etc. are stored in the vehicle information database 90 comprehensively illustrated in the drawing.

The abnormality degree calculation unit 20 determines a degree of abnormality of each of specific vehicle components on the basis of the vehicle data acquired by the data acquisition unit 10. The degree of abnormality is, in a broad sense, a degree of deviation from a normal state, and here, the degree of abnormality becomes an index indicating a degree of deterioration or a degree of damage of a component according to, for instance, a travel distance of the vehicle and progress of a use time of the vehicle. For instance, a degree of deviation between a signal detected by a certain device and a group of normal signals can be used as the degree of abnormality. Alternatively, a degree of deviation between each signal and its threshold value may be regarded as the degree of abnormality. Here, the degree of abnormality may also be expressed by a distance or time etc. that the vehicle can travel from the current vehicle condition (the current vehicle state) to an occurrence of an accident. The degree of abnormality changes according to the travel distance of the vehicle and progress of the use time of the vehicle.

Here, the degree of abnormality is separately determined before the collision and after the collision. That is, a degree of abnormality that changes (or progresses) according to the travel distance of the vehicle and progress of the use time of the vehicle before the collision is determined as a first degree of abnormality, and after the collision, a degree of abnormality as a second degree of abnormality is determined separately from the first degree of abnormality.

The degree of abnormality, e.g. the first degree of abnormality, could be determined by prediction. Prediction of change or progress of a future degree of abnormality can be performed using a known proper prediction method. For instance, the method may be a method in which a degree of deviation from a threshold value of each signal according to a condition and a rule is regarded as the degree of abnormality, and on the basis of time-series data including the engine rotation speed and the engine temperature, the change of the future degree of abnormality is predicted, an approach in which after estimating a future prediction value (future behavior) of the vehicle data acquired by the data acquisition unit 10 using a prediction method of time-series data such as LSTM (Long short-term memory), invariant analysis is performed, and a method in which when judging whether the vehicle condition (the vehicle state) is a normal condition (a normal state) or an abnormal condition (an abnormal state) using machine learning, a probability of being the abnormal condition (the abnormal state) is regarded as the degree of abnormality, and a probability of occurrence of a future abnormality is calculated from a future prediction value of the vehicle data acquired by the data acquisition unit 10. The present invention is not limited to these methods and approach, and can use appropriate methods of predicting the change of the future degree of abnormality. In one embodiment, the change of the degree of abnormality can be determined with either one of the vehicle travel distance or the vehicle travel time being a parameter. As for the second degree of abnormality too, when determining the degree of abnormality by self-travelling of the vehicle after the collision, the second degree of abnormality may be determined by the change prediction (or progress prediction).

The abnormality degree calculation unit 20 includes a component linking unit 21 that links each vehicle component with the vehicle data. For instance, in a case where abnormality of a certain piece of data correlates with operation (or movement) etc. of a plurality of vehicle components, a degree of abnormality of each vehicle component is determined based on a relation between the vehicle component and the vehicle data which is provided by the component linking unit 21. For instance, using a relation previously determined by simulation etc., factory test data, theoretical formulas or theoretical values relating to component control or operation (or movement), information on past repair history and so on, the linking is performed.

When the vehicle is capable of self-travelling even after the collision, in the same manner as the first degree of abnormality, the second degree of abnormality is determined based on the vehicle data acquired during vehicle travel. On the other hand, when the vehicle is not capable of self-travelling by the collision, because the vehicle data by the travelling cannot be acquired, the second degree of abnormality is determined based on the past accident data and/or the accident simulation data stored in the vehicle information database 90 comprehensively illustrated in the drawing. For instance, the past accident data and the accident simulation data contain information on a mode of each collision (such as an impact area and a magnitude of an exerted impact) and changes in various vehicle data (or changes in the degrees of abnormality of the vehicle components) which have occurred due to the collision. And, by referring to this database, post-collision vehicle data (vehicle data after the collision) is acquired from a data group of collisions whose modes are similar to the current collision, then the second degree of abnormality can be determined. Preferably, the past accident data and the accident simulation data contain vehicle type information (such as vehicle type or vehicle model, production time, production factory), and it is preferable to determine the second degree of abnormality from the similar data group containing the vehicle type information. Further, when the second degree of abnormality is acquired by this simulation data etc., change (or progress) of the first degree of abnormality up to the collision may be taken into consideration.

Further, in order to increase accuracy of the degree of abnormality, the first degree of abnormality and the second degree of abnormality may be corrected by vehicle position data, weather data and driving characteristic data of a driver.

The collision detection unit 30 detects a collision of the vehicle from an impact etc, at the time of the collision. The detection of the collision can be performed using various known means, e.g. means for detecting an impact such as an acceleration sensor and a pressure sensor which are attached to a vehicle body, and means capable of detecting an object and/or measuring a distance to the object such as an on-vehicle camera, sonar and radar. When detecting a collision of the own vehicle, information is transmitted to the cloud server managed by the insurance company etc. via a proper communication means. It is preferable that the collision detection unit 30 is also capable of detecting which part of a vehicle body has been hit or collided (i.e. where an impact area is). Here, collision detection by means other than the own vehicle, such as information provided from cameras of traffic infrastructure and information transmitted from a drive recorder of the vehicle before and after the accident, could be included in the collision detection unit 30. In addition, for future data analysis, accident situation data (such as a location of the accident, an object(s), the impact area and a magnitude of the impact, a judgement result as to whether the accident is a self-inflicted accident or an accident causing injury or death, which is judged from a camera image(s)) may be acquired at the same time.

The comparison unit 40 compares the first degree of abnormality and the second degree of abnormality at an appropriate timing in a case where the collision is detected by the collision detection unit 30. The appropriate timing is, for instance, a timing at which in a case where the vehicle can travel by itself (the vehicle is capable of self-travelling) after the collision, sufficient vehicle data is acquired by the self-travelling for a certain period, then a reliable second degree of abnormality can be determined, and a timing at which the vehicle is brought into a repair shop after the accident, but the appropriate timing could be other appropriate timings. In a case where the vehicle cannot travel by itself (the vehicle is not capable of self-travelling), the appropriate timing may be a timing immediately after the collision. Here, the comparison between the first degree of abnormality and the second degree of abnormality is performed for each of the large number of the vehicle components. In particular, it is desirable to perform the comparison for the vehicle components positioned outside the impact area. For instance, a difference between the first degree of abnormality and the second degree of abnormality is determined, and when this difference is a predetermined value or greater, it is judged that deterioration or internal damage has occurred by an influence of the collision even at a vehicle component(s) that is located at a position separate from the impact area or that appears to have no relationship with the collision at first glance.

If there is no vehicle component which is positioned outside the impact area and whose difference of the degree of abnormality is the predetermined value or greater, it is judged that damage has occurred only at a vehicle component(s) positioned in the impact area. This corresponds to, e.g. a vehicle component(s) that is deformed and/or damaged in appearance by the impact at the time of the collision. For instance, using a known technique like the aforementioned Patent Document 1, the damaged component can be identified.

Here, in the case where the vehicle can travel by itself (the vehicle is capable of self-travelling) after the collision, the first degree of abnormality, which is one of the objects compared by the comparison unit 40, could be a first degree of abnormality that has been calculated until the time of the collision, or may be a first degree of abnormality that is estimated, by the change prediction (progress prediction) of the first degree of abnormality based on the travel time or the travel distance after the collision, as a value after travel of an equivalent time or an equivalent distance is done.

The comparison unit 40 includes a correction unit 41 that corrects or modifies a comparison result. In this correction unit 41, for instance, driving characteristic data of the driver immediately before the collision and driving characteristic data of the driver after the collision are acquired, and when it is judged that there is an intentional driving characteristic change, the comparison between the first degree of abnormality and the second degree of abnormality or output of information on the vehicle component is not performed. The driving characteristics are, for instance, the presence or absence of aggressive driving, frequency of occurrence of dangerous driving such as sudden acceleration and sudden braking and so on. This function is provided assuming that in order for the driver to claim a larger amount of insurance money, there is a possibility that the driver (the user) drives so as to intentionally accelerate deterioration and/or damage of the vehicle component (so as to increase the second degree of abnormality) when moving (for instance, from an accident location to the repair shop) after the accident. Therefore, in order to avoid improper insurance claim, when the driving characteristic change is large, even if the difference between the first degree of abnormality and the second degree of abnormality is large, the vehicle component is not recognized as a vehicle component having been affected by the collision. Alternatively, in order to prevent the difference of the degree of abnormality from being the predetermined value or greater depending on difference of the driving characteristics, the second degree of abnormality may be corrected or the difference of the degree of abnormality may be corrected according to the driving characteristic change. When such correction is made, a message indicating that the vehicle component is no longer covered by the insurance may be notified to the user.

It is noted that the above-described correction of the degree of abnormality based on the vehicle position data, the weather data and the driving characteristic data of the driver may be performed by or in this correction unit 41.

For ease of understanding, the first degree of abnormality and the second degree of abnormality and also the comparison between these two in the comparison unit 40 will be described using a simple example. For instance, since it is known that deterioration of a suspension can be obtained by the following expression (Japanese Patent No. JP4915096, Japanese Unexamined Patent Application Publication No. JPH10-132585, etc.), this is taken as a degree of abnormality of the suspension.

> Degree of abnormality=total vehicle weight×variation of suspension×correction coefficient (tire pressure and road surface condition (such as rainfall, snowfall, outside air temperature and degree of unevenness of road surface))

Here, at least the variation of suspension which is detected by the sensor corresponds to the vehicle data, A parameter contributing to the correction coefficient could also be the vehicle data. If the variation (a variation sensor value) is 0.1 cm, the vehicle weight is 1350 kg and the correction coefficient is 1 before the collision, a first degree of abnormality is 135. Further, if the variation (a variation sensor value) is 1.0 cm after the collision, a second degree of abnormality is 1350. Therefore, the difference between the first degree of abnormality and the second degree of abnormality is 1215. Then, by comparing this difference with an appropriate threshold value, it is judged whether there have been deterioration and/or damage due to the collision. For instance, if the threshold value is set to 1000, it is judged that deterioration and/or damage have occurred at the suspension due to the collision. This case includes, for instance, slight deformation or damage of each part of the suspension, failure of the variation sensor, etc.

For the comparison of the degree of abnormality, an average value of a certain travel section (a travel time or a travel distance) could be used. For instance, when determining an average value of each one hour, if an average of a variation sensor value of one hour travel before the collision is 0.5 cm and an average of a variation sensor value of one hour travel after the collision is 0.7 cm, a first degree of abnormality of the one-hour travel section is 725, and a second degree of abnormality of the one-hour travel section is 995, then the difference of the degree of abnormality is 270. If the threshold value is set to 1000, in this example, the difference of the degree of abnormality is less than the threshold value, then it is judged that there is no deterioration or no damage at the suspension by the collision.

Here, it is preferable that the one-hour travel section before the collision and the one-hour travel section after the collision are sections that are as similar as possible to each other in road conditions and travel conditions. For instance, it is desirable that among first degrees of abnormality and second degrees of abnormality determined for each one hour during the travel before and after the collision, a first degree of abnormality and a second degree of abnormality are extracted and compared with each other under similar conditions.

The magnitude evaluation of the difference between the first degree of abnormality and the second degree of abnormality may be based on an absolute value of the difference as in the above example, or the evaluation may be performed by a ratio or a proportion, etc. between the first degree of abnormality and the second degree of abnormality.

In addition, the correction unit 41 judges, by acquiring driving characteristics at the time of calculation of the first degree of abnormality and driving characteristics at the time of calculation of the second degree of abnormality with these driving characteristics being converted into numbers and comparing the difference between these two with the threshold value, whether the driving characteristics have been intentionally changed. As an example, the number of times of sudden start and sudden braking for each certain travel distance section (10 km) is taken as a dangerous driving rate, i.e. the driving characteristics. If an average value of the number of times of the sudden start and the sudden braking for the travel distance section (10 km) before the collision is 1 and an average value of the number of times of the sudden start and the sudden braking for the travel distance section (10 km) after the collision is 20, a difference of the driving characteristics is calculated as "20−1=19". Here, if the threshold value is 10 (times), in this example, it is judged that the driver intentionally did the sudden start and the sudden braking after the collision.

In addition to such change in the driving characteristics, in order to eliminate an influence by factors (e.g. travelling environment such as weather, road conditions and temperature, difference of the driver, etc.) that are considered that the reason for the large difference of the degree of abnormality is not caused by the accident, by using arbitrary reference and factor, judgement as to whether the difference of the degree of abnormality is caused by the collision can be made.

In the above example, besides evaluating the difference between the first degree of abnormality and the second degree of abnormality, the change in the driving characteristics is evaluated. However, for instance, the change in the driving characteristics (e.g. the difference) is calculated, and this may be used as a correction coefficient of the first degree of abnormality or the second degree of abnormality used in the comparison unit 40, or of the difference between these two. That is, the difference between the first degree of abnormality and the second degree of abnormality may be evaluated with consideration given to the change in the driving characteristics.

The transmission unit 50 transmits, when a collision of the vehicle occurs, processing results as in the above to one display unit 60 or a plurality of display units 60 together with necessary information and/or data. For instance, a list of the vehicle components, including the vehicle components in the impact area, which require repair or replacement, and data (behavior, photograph, sound data, etc. of the vehicle component(s) before and after the collision) of the vehicle component(s) whose difference between the first degree of abnormality and the second degree of abnormality is the threshold value or greater (i.e. the vehicle component(s) positioned outside the impact area and having been affected in terms of deterioration etc.) and its judgment evidence (or reason for judgment), are transmitted. In addition, data and information in arbitrary format, e.g. video data recorded during the drive such as a driving recorder, GPS information including position information indicating a travel section, vehicle signals such as CAN data, image data of an vehicle exterior and condition or state of the vehicle component(s) after the collision, an exterior photograph and an explanatory drawing of an installation position of the corresponding component(s) obtained from a database of a parts list, etc. could be included.

Further, as data for analysis of the accident and serving as evidence of procedures and handling (or processing) associated with the accident, for instance, upon detecting the collision, travel data at the time of the collision, driving characteristic data before the collision, driving characteristic data after the collision, data of change in the driving characteristics before and after the collision, behavior, photograph, sound data, etc. of the corresponding vehicle component(s) before and after the collision, post-collision vehicle data (vehicle data after the collision) used for the calculation of the second degree of abnormality, accident situation data (such as a location of the accident, an object(s), the impact area and a magnitude of the impact, a judgement result as to whether the accident is a self-inflicted accident or an accident causing injury or death, which is judged from a camera image(s)) obtained by the on-vehicle camera etc., may be transmitted together.

The display unit 60 generates an image to be displayed based on the information transmitted from the transmission unit 50, and displays the image on a display. The display unit 60 includes, for instance, a terminal(s) of the insurance company, the automobile sales company, etc. which manage the cloud system, a smartphone and a personal computer which are owned by a user, and a display mounted on the vehicle.

In one embodiment, in addition to the above, the display unit 60, which is a transmission target of the transmission unit 50, may include a smartphone and a personal computer which are owned by other parties. The other parties include, for instance, a party concerned (police etc.) involved in the accident analysis of the accident handling (or processing), a party concerned (a lawyer or an agent) involved in legal processing, staff of a rental car or a vehicle dispatching service which arrange a replacement vehicle (a loaner vehicle), staff of the automobile sales company, a maintenance shop, a towing service such as a wrecker, etc.

Although a method of displaying the vehicle components affected by the collision is arbitrary, for instance, in order to easily understand a magnitude or an extent of damage by the collision, the components can be displayed in order of the largest difference between the first degree of abnormality and the second degree of abnormality. Further, in order to clearly indicate the presence of the vehicle components which are outside the impact area, but need repairing, the vehicle components (in other words, the vehicle components in the impact area) on which collision energy would have been directly exerted and the vehicle components (in other words, the vehicle components outside the impact area) on which the collision energy would have been indirectly exerted are classified based on the information about the collision, then the both may be displayed separately.

Figure 3:
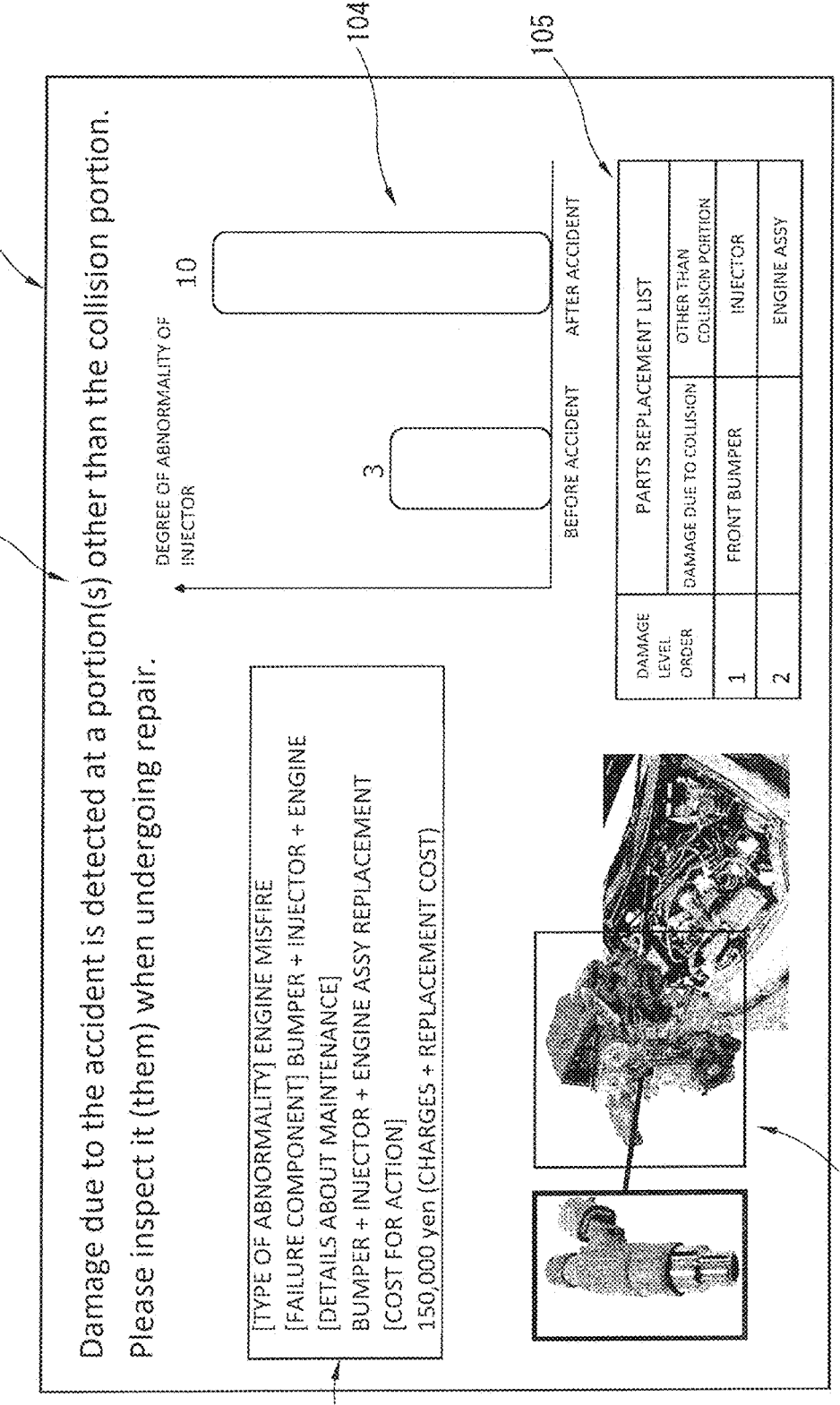
FIG. 3 is an explanatory drawing illustrating an example of display of a display unit.

FIG. 3 is an explanatory drawing illustrating an example of display of the display unit 60 of the user, insurance company, etc. In this example, in an area 101 at an upper portion on a screen, a text message saying that "Damage due to the accident is detected at a portion(s) other than the collision portion. Please inspect it (them) when undergoing repair." is displayed. In an area 102 at a left side on the screen, contents of the damage are displayed. The contents include items of "TYPE OF ABNORMALITY", "FAILURE COMPONENT", "DETAILS ABOUT MAINTENANCE" and "COST FOR ACTION". In this example, in addition to a text message saying that replacement of a bumper is required, text messages saying that there is an abnormality of engine misfire (engine failure), that replacement of an injector and an engine assembly is required, and that a cost is 150,000 yen, are indicated. In an area 103 at a lower left on the screen, a photograph of the injector and a photograph of the engine assembly, which are vehicle components that have been damaged, but are invisible in appearance, are displayed together with a photograph showing an engine room. These photographs are acquired from the above-mentioned database of the parts list.

Here, preferably, as an additional function, the data analysis device according to one embodiment is linked to a maintenance and repair database (not shown) of each vehicle component, determines an appropriate maintenance course for the vehicle component(s) that is identified as a vehicle component(s) whose difference between the first degree of abnormality and the second degree of abnormality is the threshold value or greater by referring to the maintenance and repair database, and can calculate an approximate repair price along this maintenance course. The text messages "Details about maintenance" and "Cost for action" in FIG. 3 are displayed along these maintenance course and approximate repair price.

Further, in an area 104 at an upper right on the screen, as evidence that the injector is defective, a bar graph comparing a degree of abnormality of the injector before the collision and a degree of abnormality of the injector after the collision is displayed.

In an area 105 at a lower right on the screen, a component replacement list is displayed in order of "DAMAGE LEVEL", particularly with the components being classified into "DAMAGE DUE TO COLLISION" and "OTHER THAN COLLISION PORTION", The former shows "FRONT BUMPER". The latter shows "INJECTOR" and "ENGINE ASSY", and "INJECTOR" is listed higher than "ENGINE ASSY" as order of the damage level.

Figure 4:
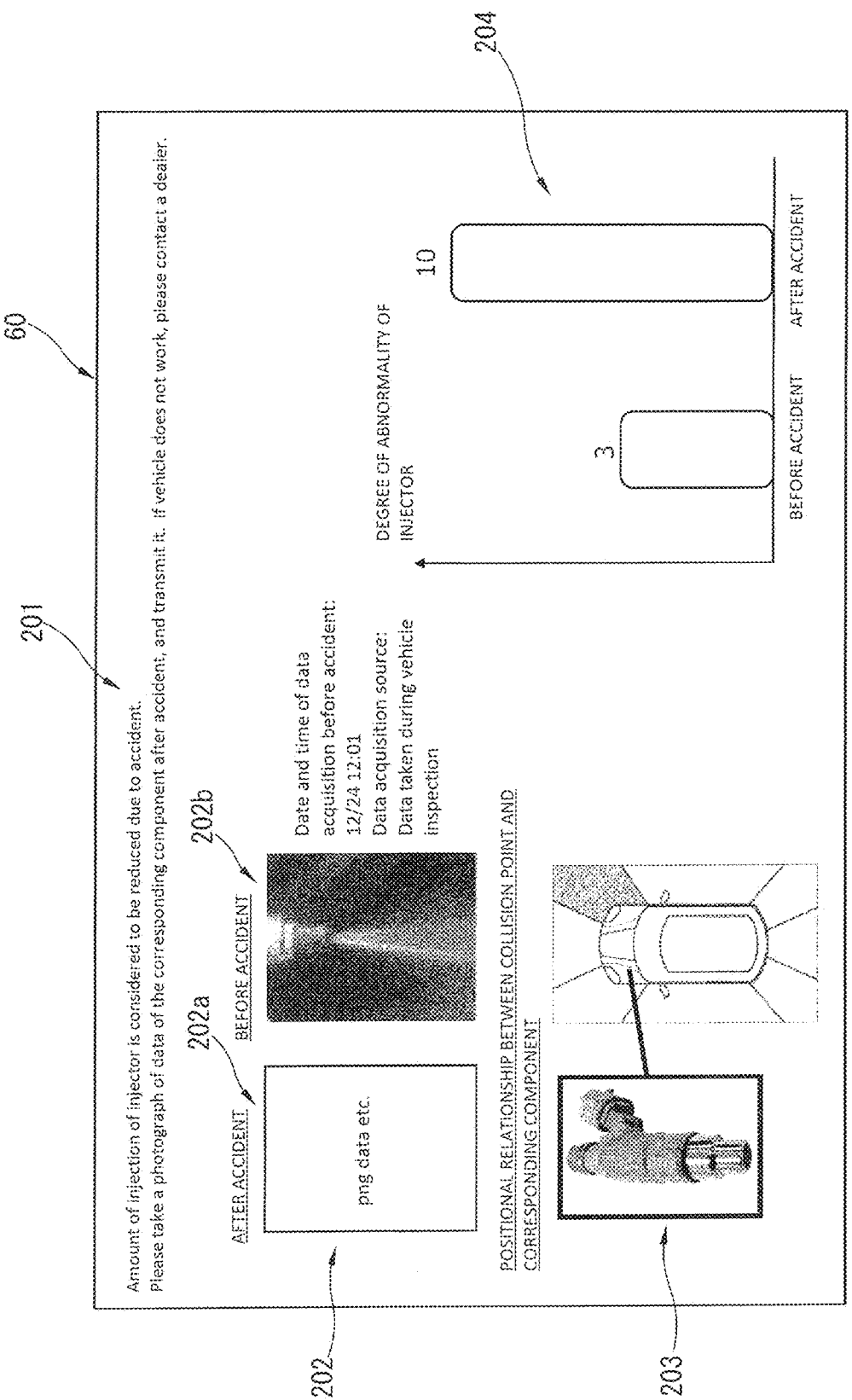
FIG. 4 is an explanatory drawing illustrating another example of display of the display unit.

FIG. 4 illustrates another example of display of the display unit 60 for the user, the repair shop, etc. In this example, in an area 201 at an upper portion on a screen, a text message saying that "Amount of injection of injector is considered to be reduced due to accident. Please take a photograph of data of the corresponding component after accident, and transmit it. If vehicle does not work, please contact a dealer." is displayed. In an area 202 at an upper left on the screen, as the evidence that the injector is defective, photographs showing a fuel injection state of the injector are displayed side by side. An area 202a shows a photograph after the accident, and an area 202b shows a photograph before the accident. The photograph in the area 202a is displayed when the user etc. transmit the photograph data in accordance with the above text message. In this example, however, the area 202a is still blank. The pre-accident photograph 202b is labeled with data, time, etc. of photograph, as "Date and time of data acquisition before accident: 12/24 12:01" and "Data acquisition source: Data taken during vehicle inspection".

An area 203 at a lower left on the screen is labeled as "POSITIONAL RELATIONSHIP BETWEEN COLLISION POINT AND CORRESPONDING COMPONENT". The area 203 displays a photograph of the injector which is the vehicle component that have been damaged, but is invisible in appearance, together with an explanatory drawing of a top view of the vehicle, and shows a position of the injector and the collision point on the explanatory drawing of the top view. Further, in an area 204 at a right side on the screen, as the evidence that the injector is defective, a bar graph comparing a degree of abnormality of the injector before the collision and a degree of abnormality of the injector after the collision is displayed.

Figure 5:
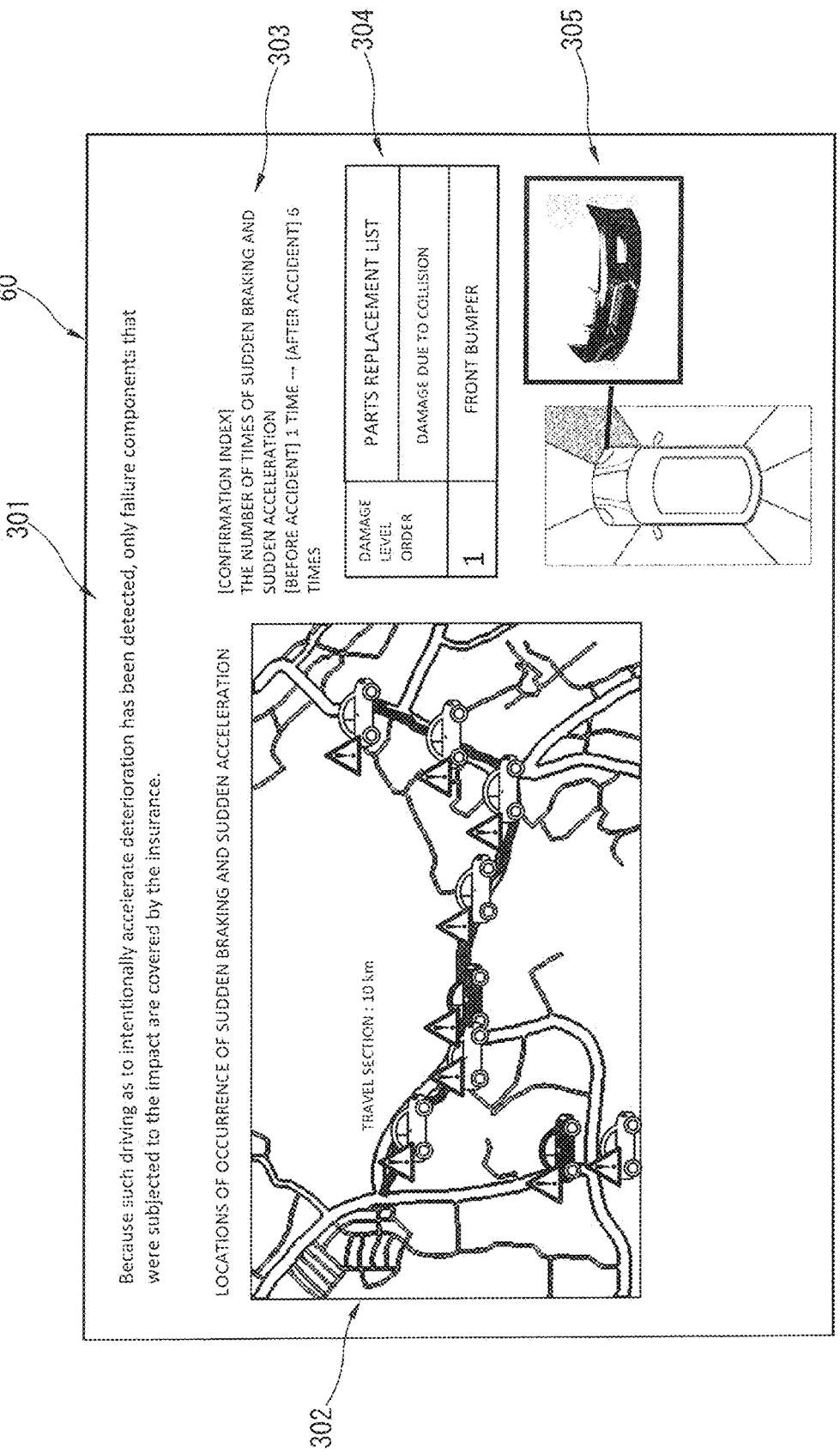
FIG. 5 is an explanatory drawing illustrating still another example of display of the display unit.

FIG. 5 illustrates an example of display of the display unit 60 when the correction unit 41 judges that the driver has intentionally changed the driving characteristics to the driving characteristics including sudden acceleration and sudden braking after the collision. In this example, in an area 301 at an upper portion on a screen, a text message saying that "Because such driving as to intentionally accelerate deterioration has been detected, only failure components that were subjected to the impact are covered by the insurance." is displayed. An area 302 at a left side on the screen is labeled as "LOCATIONS OF OCCURRENCE OF SUDDEN BRAKING AND SUDDEN ACCELERATION". The area 302 displays a map showing a travel section where the vehicle is considered to have travelled with the sudden braking and the sudden acceleration, and shows locations of the sudden braking and the sudden acceleration on this map. In an area 303 at an upper right on the screen, text messages saying that "[CONFIRMATION INDEX] THE NUMBER OF TIMES OF SUDDEN BRAKING AND SUDDEN ACCELERATION" and that "[BEFORE ACCIDENT] 1 TIME→[AFTER ACCIDENT] 6 TIMES" are displayed. Further, in an area 304 at a lower right on the screen, a component replacement list shown in order of the damage level, which is similar to FIG. 3, is displayed. In addition, in the same manner as FIG. 4, an area 305 below the area 304 displays a photograph of the front bumper, which is a replacement component, together with an explanatory drawing of the top view showing the collision point.

In this example, since the intentional sudden braking and sudden acceleration occurred, for instance, the injector that is the component outside the impact area, which is described in the example of FIG. 3, is excluded from the component replacement list, and only the front bumper on which the collision energy was directly exerted is listed.

As described above, by identifying the vehicle component(s) which is outside the impact area, but has been affected in terms of some deterioration or some internal damage based on the comparison between the first degree of abnormality before the collision and the second degree of abnormality after the collision and clearly indicating this to the user, the insurance company, etc., the problem of insurance claim etc. between the parties can be readily solved.

Figure 2:
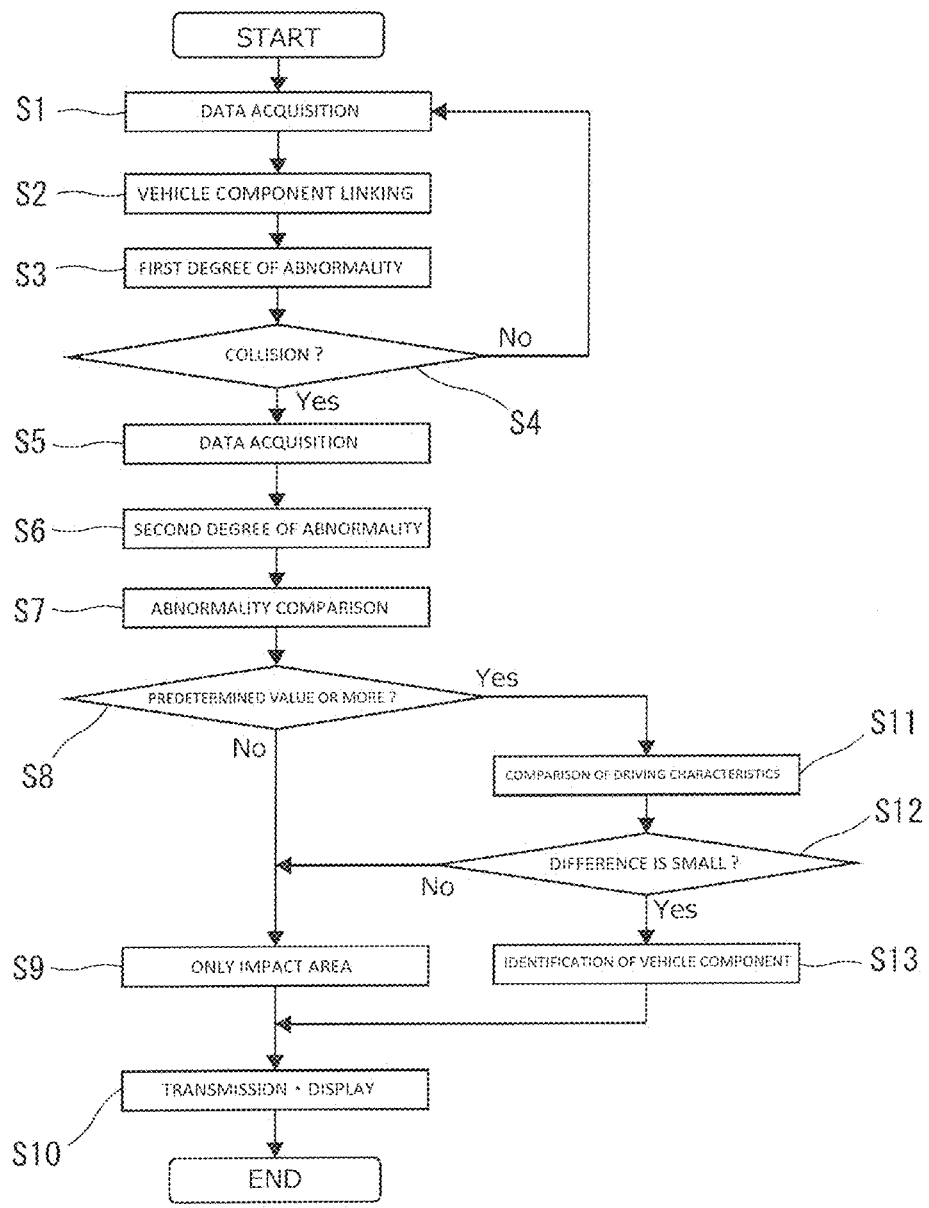
FIG. 2 is a flow chart illustrating a process flow according to the first embodiment.

FIG. 2 is a flow chart illustrating a process flow executed in the vehicle data analysis device according to the first embodiment. First, various vehicle data are acquired (at step S1), and these vehicle data are linked (associated) with each vehicle component (at step S2). Next, the first degree of abnormality is determined for each vehicle component based on the vehicle data obtained at step S1 (at step S3). This first degree of abnormality is repeatedly calculated during the travel. As described above, its change (or progress) may be predicted.

Next, detection of a collision is performed at step S4. The calculation of the first degree of abnormality continues until the collision is detected. If the collision is detected, the routine proceeds to step S5, and the vehicle data is acquired during the self-travelling after the collision. If the vehicle is not capable of self-travelling, at step S5, instead of the acquisition of the vehicle data by the travelling, as described above, as the post-collision vehicle data, data of similar collision is acquired from the past accident data and/or the accident simulation data stored in the vehicle information database 90. Then, at step S6, in the same manner as the calculation of the first degree of abnormality, the second degree of abnormality, which is the degree of abnormality after the collision, is determined for each vehicle component.

Subsequently, at step S7, the first degree of abnormality and the second degree of abnormality are compared with each other for each vehicle component. At step S8, a judgment is made as to whether or not there is a vehicle component whose second degree of abnormality is greater than whose first degree of abnormality by the predetermined value or more, i.e. a judgment is made as to whether or not there is a vehicle component whose difference between the first degree of abnormality and the second degree of abnormality is the threshold value or greater. If the judgment at step S8 is NO, the routine proceeds to step S9, and the failure component(s) (the damaged component(s)) is identified only from the collision point (the impact area). After that, the routine proceeds to step S10, and necessary information to be displayed (the component information, the behavior, the photograph, the sound data, etc. of the corresponding vehicle component(s) before and after the collision, etc.) is transmitted to the display unit 60, and is displayed on the display unit 60.

On the other hand, if the judgment at step S8 is YES, the routine proceeds to step S11 from step S8, and the driving characteristics at the time of the calculation of the first degree of abnormality and the driving characteristics at the time of the calculation of the second degree of abnormality are determined and compared with each other. Then, at step S12, a judgment is made as to whether or not a difference between these two driving characteristics is small. If the difference between the two driving characteristics is small, it is judged that there is no intentional worsening (deterioration) of the second degree of abnormality, and the routine proceeds to step S13. At step S13, the vehicle component(s) whose second degree of abnormality is greater than whose first degree of abnormality by the predetermined value or more is identified as the vehicle component(s) which is outside the impact area, but has been affected in terms of deterioration or internal damage. After that, the routine proceeds to step S10, and necessary information to be displayed (the component information, the behavior, the photograph, the sound data, etc, of the corresponding vehicle component(s) before and after the collision, etc.) is transmitted to the display unit 60, and is displayed on the display unit 60.

At step S12, if the difference between the two driving characteristics is large, it is judged that there has been intentional worsening (deterioration) of the second degree of abnormality, and the routine proceeds to step S9. In this case, as described above, the failure component(s) (the damaged component(s)) is identified only from the collision point (the impact area), and is displayed.

Next, a second embodiment according to the present invention will be described. In the second embodiment, even if a vehicle component has a large second degree of abnormality due to the collision, if the large second degree of abnormality is merely caused by looseness of a fastening member, e.g. a fastening nut, this vehicle component is excluded from objects of the insurance claim. That is, since worsening (deterioration) of the degree of abnormality due to the looseness of the fastening nut is not essential deterioration or failure of the vehicle component itself, this is handled separately.

Figure 6:
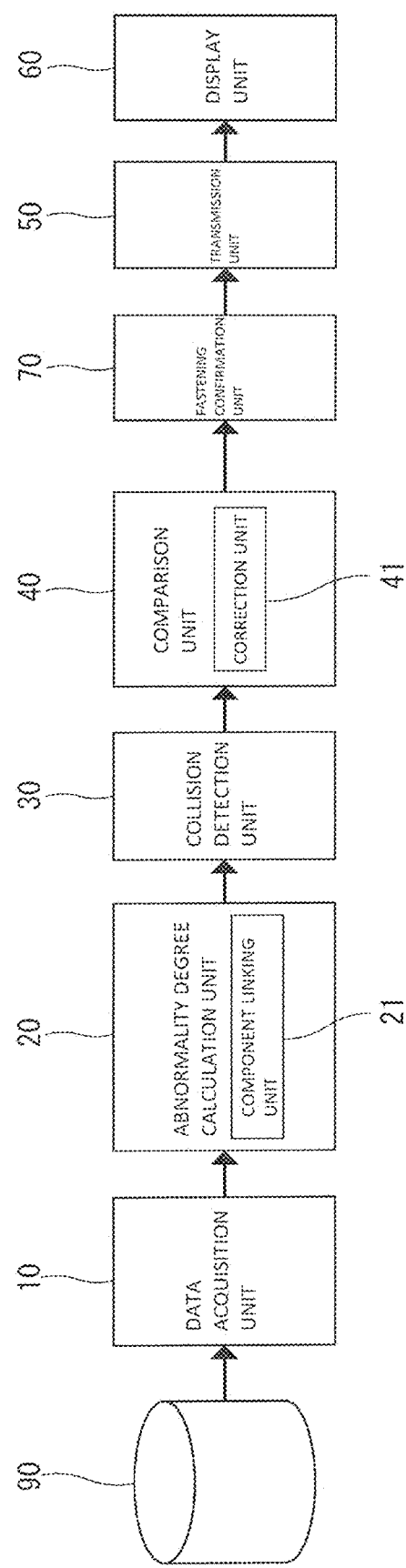
FIG. 6 is a functional block diagram of a data analysis device according to a second embodiment.

FIG. 6 is a functional block diagram of a data analysis device according to the second embodiment. Similar to the first embodiment, this data analysis device has a data acquisition unit 10, an abnormality degree calculation unit 20, a collision detection unit 30, a comparison unit 40, a transmission unit 50 and a display unit 60, and also has a fastening confirmation unit 70.

The data acquisition unit 10, the abnormality degree calculation unit 20, the collision detection unit 30, the comparison unit 40, the transmission unit 50 and the display unit 60 are basically the same as those in the above first embodiment.

The fastening confirmation unit 70 confirms or checks whether a fastening member that fixes a vehicle component (particularly a vehicle component that has been judged to have a greater second degree of abnormality than the first degree of abnormality by the predetermined value or more by the comparison unit 40) has loosened by the collision. For instance, a technique of monitoring a fastening torque of a fastening member such as bolt and nut and communicating it to an external device is known (Japanese Unexamined Patent Application Publication No. JP2006346784 etc.). Information about the fastening torque for each vehicle component is acquired using such technique. Then, for the vehicle component whose second degree of abnormality is greater than whose first degree of abnormality by the predetermined value or more, for instance, if its fastening torque is a reference value or less, it is judged that the fastening member has loosened, and one display unit 60 or a plurality of display units 60 displays a notification or an instruction that fastening work or inspection should be done to the user and/or the repair shop via the transmission unit 50. Further, if the travel continues in such a state that the fastening member has loosened, there is apprehension that abnormality of the vehicle component will worsen or an unexpected trouble will occur. Therefore, a notification that the user refrains from travelling and inspection should be carried out is given to the user via the transmission unit 50 and the display unit 60. Furthermore, if the vehicle component has the greater second degree of abnormality than the first degree of abnormality by the predetermined value or more, but its fastening torque is the reference value or less, this vehicle component is excluded from objects of the insurance claim, and is displayed separately. This vehicle component basically corresponds to a vehicle component which, if the fastening member such as the bolt and the nut is fastened, provides no hindrance.

Figure 8:
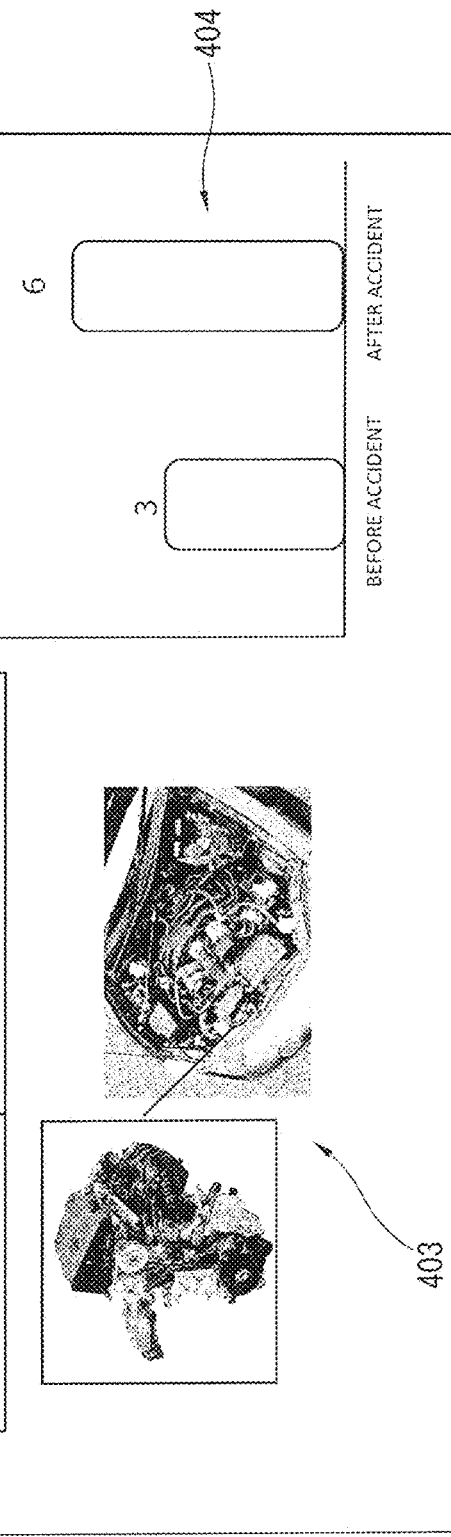
FIG. 8 is an explanatory drawing illustrating an example of display according to the second embodiment.

FIG. 8 illustrates an example of display of the display unit 60 (e.g. the smartphone of the user, the display of the vehicle, etc.) for, for instance, the user when the fastening torque of the fastening member is the reference value or less as described above. In this example, in an area 401 at an upper portion on a screen, a text message saying that "There is a portion(s) where fastening torque is insufficient. Please refrain from travelling and have the vehicle inspected immediately. The portion(s) needing fastening is not covered by the insurance." is displayed. In an area 402 at a left side on the screen, the portion where the fastening torque is the reference value or less is displayed as "PORTION NEEDING FASTENING" and "ENGINE ASSY" in the text form. An area 403 below the area 402 displays a photograph of the engine assembly which is the portion requiring the fastening work together with a photograph showing an engine room. These photographs are acquired from the above-mentioned database of the parts list. Further, in an area 404 at an upper right on the screen, a bar graph comparing a degree of abnormality (i.e. a first degree of abnormality) of the engine assembly before the collision and a degree of abnormality (i.e. a second degree of abnormality) of the engine assembly after the collision is displayed. The same may be displayed on a terminal of the insurance company, the repair shop, etc.

With such display, the user can know that the portion where the bolt or the nut has loosened by the collision exists, and can have the vehicle inspected and repaired at the repair shop before an unexpected trouble occurs. In addition, by clearly indicating that this is excluded from objects of the insurance claim, there will be less disputes between the parties.

Figure 7:
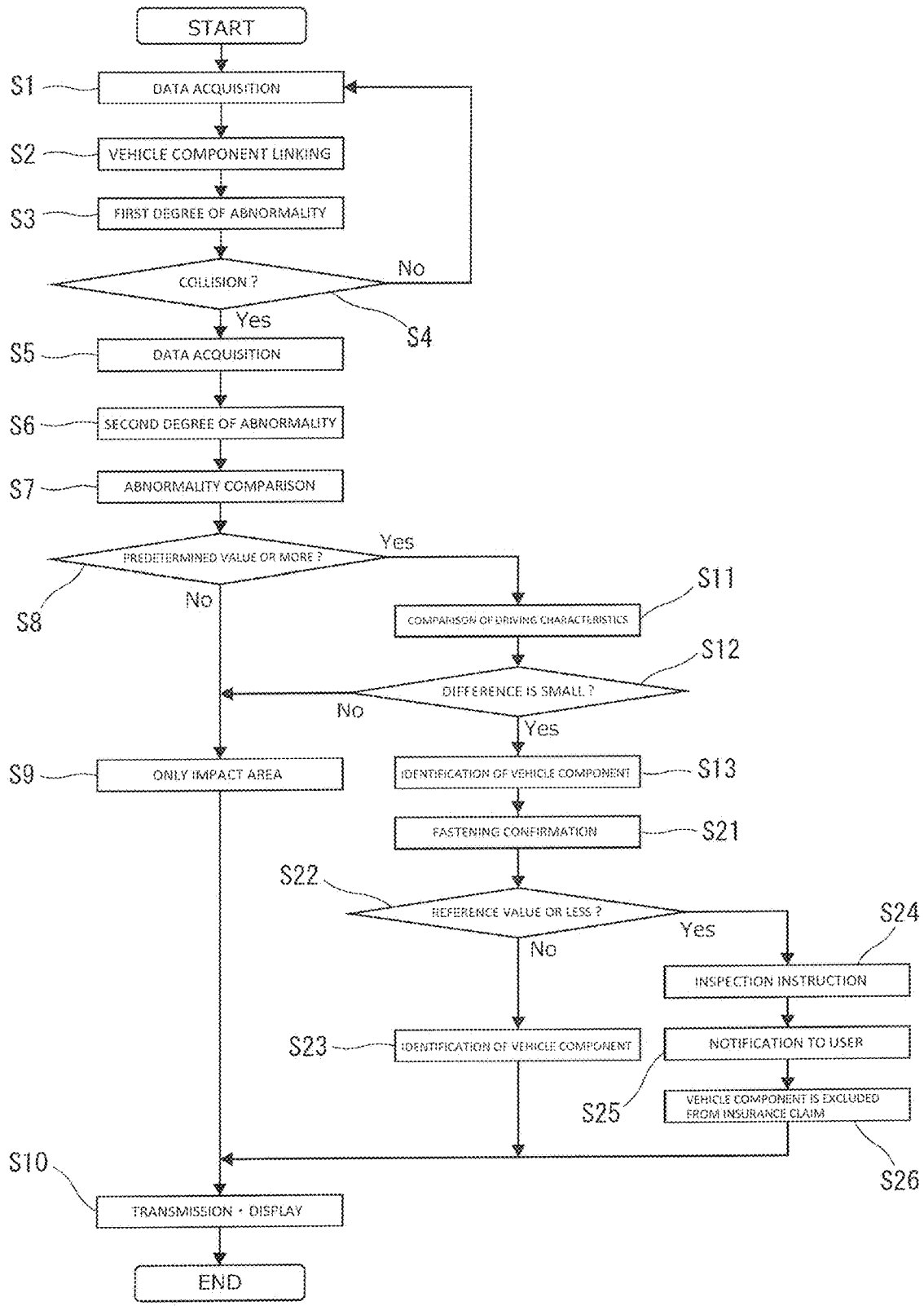
FIG. 7 is a flow chart illustrating a process flow according to the second embodiment.

Next, FIG. 7 is a flow chart illustrating a process flow executed in the vehicle data analysis device according to the second embodiment. The flow chart is the same as that of the first embodiment except for a process of confirming the fastening torque of the fastening member. First, various vehicle data are acquired (at step S1), and these vehicle data are linked (associated) with each vehicle component (at step S2). Next, the first degree of abnormality is determined for each vehicle component based on the vehicle data obtained at step S1 (at step S3).

Next, detection of a collision is performed at step S4. If the collision is detected, the routine proceeds to step S5, and the vehicle data is acquired during the self-travelling after the collision. If the vehicle is not capable of self-travelling, at step S5, instead of the acquisition of the vehicle data by the travelling, the post-collision vehicle data is acquired by the past accident data etc. from the vehicle information database 90. Then, at step S6, in the same manner as the calculation of the first degree of abnormality, the second degree of abnormality, which is the degree of abnormality after the collision, is determined for each vehicle component.

Subsequently, at step S7, the first degree of abnormality and the second degree of abnormality are compared with each other for each vehicle component. At step S8, a judgment is made as to whether or not there is a vehicle component whose second degree of abnormality is greater than whose first degree of abnormality by the predetermined value or more, i.e. a judgment is made as to whether or not there is a vehicle component whose difference between the first degree of abnormality and the second degree of abnormality is the threshold value or greater. If the judgment at step S8 is NO, the routine proceeds to step S9, and the failure component(s) (the damaged component(s)) is identified only from the collision point (the impact area). After that, the routine proceeds to step S10, and necessary information to be displayed (the component information, the behavior, the photograph, the sound data, etc. of the corresponding vehicle component(s) before and after the collision, etc.) is transmitted to the display unit 60, and is displayed on the display unit 60.

On the other hand, if the judgment at step S8 is YES, the routine proceeds to step S11 from step S8, and the driving characteristics at the time of the calculation of the first degree of abnormality and the driving characteristics at the time of the calculation of the second degree of abnormality are determined and compared with each other. Then, at step S12, a judgment is made as to whether or not a difference between these two driving characteristics is small. That is, a judgment is made as to whether or not there is intentional worsening (deterioration) of the second degree of abnormality.

If it is judged that the difference between the two driving characteristics is small at step S12, the routine proceeds to step S13 from step S12, and the vehicle component(s) whose second degree of abnormality is greater than whose first degree of abnormality by the predetermined value or more is temporarily identified as the vehicle component(s) which is outside the impact area, but has been affected in terms of deterioration or internal damage.

In the second embodiment, next, the routine proceeds to step S21, and the fastening torque of the fastening member is confirmed for each vehicle component. That is, the fastening torque is compared with the reference value.

Then, at step S22, a judgment is made as to whether or not there is a vehicle component whose second degree of abnormality is greater than whose first degree of abnormality by the predetermined value or more and also whose fastening torque is the reference value or less. If NO, the routine proceeds to step S23, and the vehicle component(s) whose second degree of abnormality is greater than whose first degree of abnormality by the predetermined value or more is finally identified as the vehicle component(s) which is outside the impact area, but has been affected in terms of deterioration or internal damage. After that, the routine proceeds to step S10, and necessary information to be displayed (the component information, the behavior, the photograph, the sound data, etc. of the corresponding vehicle component(s) before and after the collision, etc.) is transmitted to the display unit 60, and is displayed on the display unit 60. The display in this case is similar to those shown in FIGS. 3 and 4.

On the other hand, if it is judged that there is a vehicle component whose second degree of abnormality is greater than whose first degree of abnormality by the predetermined value or more and also whose fastening torque is the reference value or less at step S22, the routine proceeds to step S24, and an instruction of inspection and fastening is given to the repair shop (e.g. the dealer), and at step S25, a notification that the user refrains from driving the vehicle is given to the user. Then, at step S26, the vehicle component whose fastening toque is insufficient is excluded from objects of the insurance claim, and the vehicle component(s) whose second degree of abnormality is greater than whose first degree of abnormality by the predetermined value or more is finally identified as the vehicle component(s) which is outside the impact area, but has been affected in terms of deterioration or internal damage. Finally, at step S10, necessary information to be displayed (the component information, the behavior, the photograph, the sound data, etc. of the corresponding vehicle component(s) before and after the collision, etc.) is transmitted to the display unit 60, and is displayed on the display unit 60. In this case, these are displayed as shown in FIG. 8.

Next, a third embodiment according to the present invention will be described. In the third embodiment, a vehicle component whose second degree of abnormality is large due to the fact that foreign matter (e.g. stones scattered by an impact of an accident, fragments of the component, water or moisture, etc.) came into or entered the vehicle by the collision is excluded from objects of the insurance claim. That is, since worsening (deterioration) of the degree of abnormality due to the entry of the foreign matter is not essential deterioration or failure of the vehicle component itself, this is handled separately.

Figure 9:
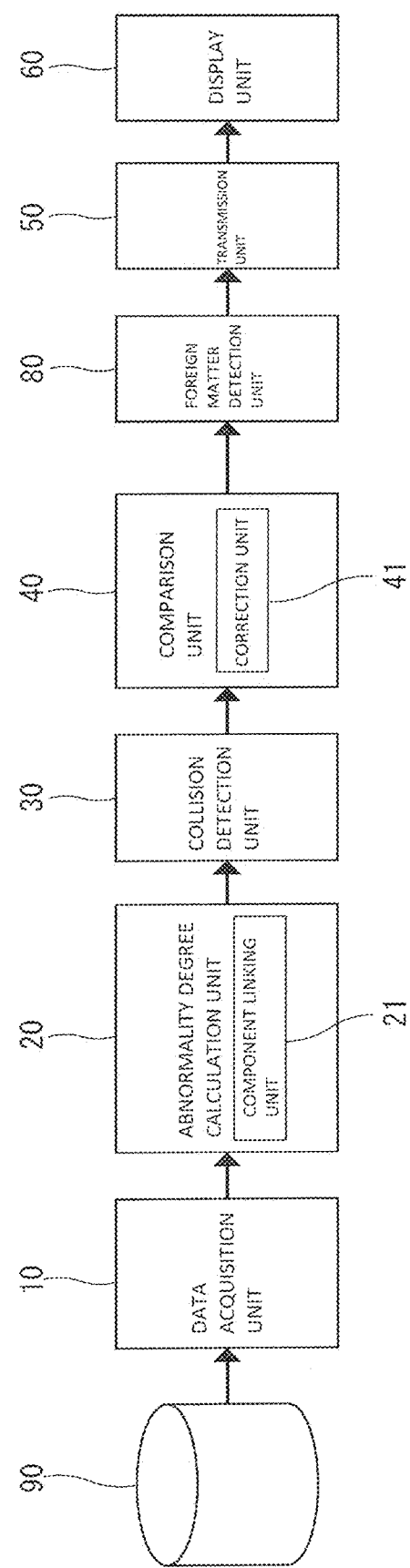
FIG. 9 is a functional block diagram of a data analysis device according to a third embodiment.

FIG. 9 is a functional block diagram of a data analysis device according to the third embodiment. Similar to the first embodiment, this data analysis device has a data acquisition unit 10, an abnormality degree calculation unit 20, a collision detection unit 30, a comparison unit 40, a transmission unit 50 and a display unit 60, and also has a foreign matter detection unit 80.

The data acquisition unit 10, the abnormality degree calculation unit 20, the collision detection unit 30, the comparison unit 40, the transmission unit 50 and the display unit 60 are basically the same as those in the above first embodiment.

The foreign matter detection unit 80 detects entry of the foreign matter into each vehicle component due to the collision, particularly entry of the foreign matter relating to a degree of abnormality of a vehicle component that has been judged to have a greater second degree of abnormality than the first degree of abnormality by the predetermined value or more by the comparison unit 40. For instance, using techniques such as object detection by the on-vehicle camera, distance measurement to an object by laser, sonar, etc. and foreign matter detection by brightness value or luminance value, entry of the foreign matter into a specific portion or area of the vehicle is detected. In the same manner as the collision detection, the foreign matter detection may be performed by means other than the own vehicle such as information transmitted from a drive recorder of the vehicle before and after the accident. If it is judged that there has been entry of the foreign matter, one display unit 60 or a plurality of display units 60 displays a notification or an instruction that foreign matter removal work or inspection should be done to the user and/or the repair shop via the transmission unit 50. Further, if the travel continues in such a state that the foreign matter has entered, there is apprehension that abnormality of the vehicle component will worsen or an unexpected trouble will occur. Therefore, a notification that the user refrains from travelling and inspection should be carried out is given to the user via the transmission unit 50 and the display unit 60. Furthermore, if the vehicle component has the greater second degree of abnormality than the first degree of abnormality by the predetermined value or more, but entry of the foreign matter is involved in the degree of abnormality, this vehicle component is excluded from objects of the insurance claim, and is displayed separately. This vehicle component basically corresponds to a vehicle component which, if the foreign matter is removed, provides no hindrance.

Figure 11:
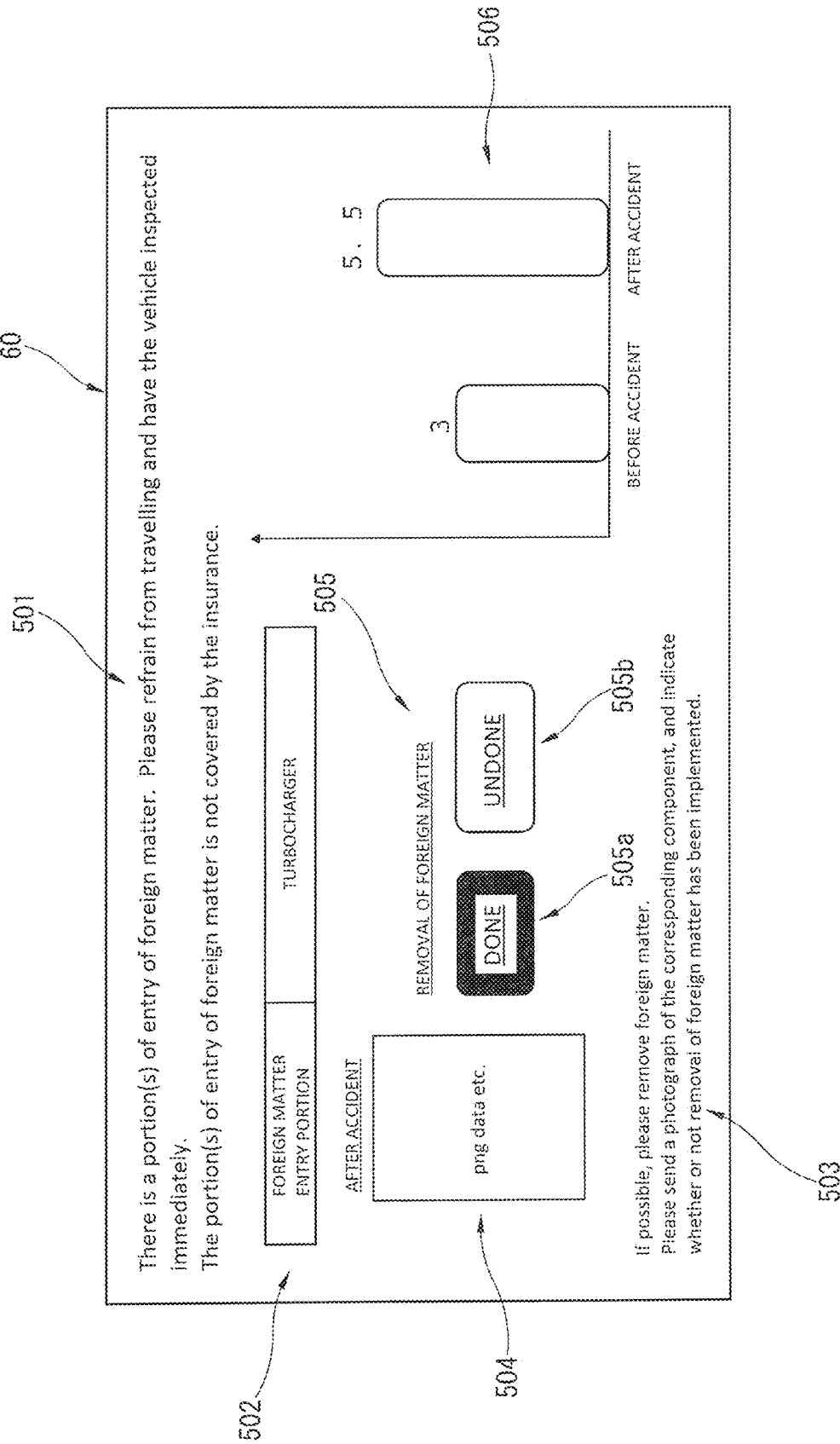
FIG. 11 is an explanatory drawing illustrating an example of display according to the third embodiment.

FIG. 11 illustrates an example of display of the display unit 60 (e.g. the smartphone of the user, the display of the vehicle, etc.) for, for instance, the user when detecting the entry of the foreign matter as described above. In this example, in an area 501 at an upper portion on a screen, a text message saying that "There is a portion(s) of entry of foreign matter. Please refrain from travelling and have the vehicle inspected immediately. The portion(s) of entry of foreign matter is not covered by the insurance." is displayed. In an area 502 at a left side on the screen, the portion where the entry of the foreign matter has been detected is displayed as "FOREIGN MATTER ENTRY PORTION" and "TURBOCHARGER" in the text form. In an area 503 at a lower left on the screen, a text message saying that "If possible, please remove foreign matter. Please send a photograph of the corresponding component, and indicate whether or not removal of foreign matter has been implemented." is displayed. Between the area 502 and the area 503, an area 504 where when the user etc. send image data in accordance with the instruction by the text of the area 503, the image data is displayed, is provided with a title "AFTER ACCIDENT" labeled. Further, in an area 505 at a right side of the area 504, a title "REMOVAL OF FOREIGN MATTER" is labeled, and buttons 505a and 505b with characters of "DONE" and "UNDONE" are provided. The user etc. select either one button in accordance with the text of the area 503. Furthermore, in an area 506 at an upper right on the screen, a bar graph comparing a degree of abnormality (i.e. a first degree of abnormality) of the turbocharger before the collision and a degree of abnormality (i.e. a second degree of abnormality) of the turbocharger after the collision is displayed. The same may be displayed on a terminal of the insurance company, the repair shop, etc.

With such display, the user can know that the portion where the foreign matter has entered exists, and can have the vehicle inspected and repaired at the repair shop before an unexpected trouble occurs. In addition, by clearly indicating that this is excluded from objects of the insurance claim, there will be less disputes between the parties.

Figure 10:
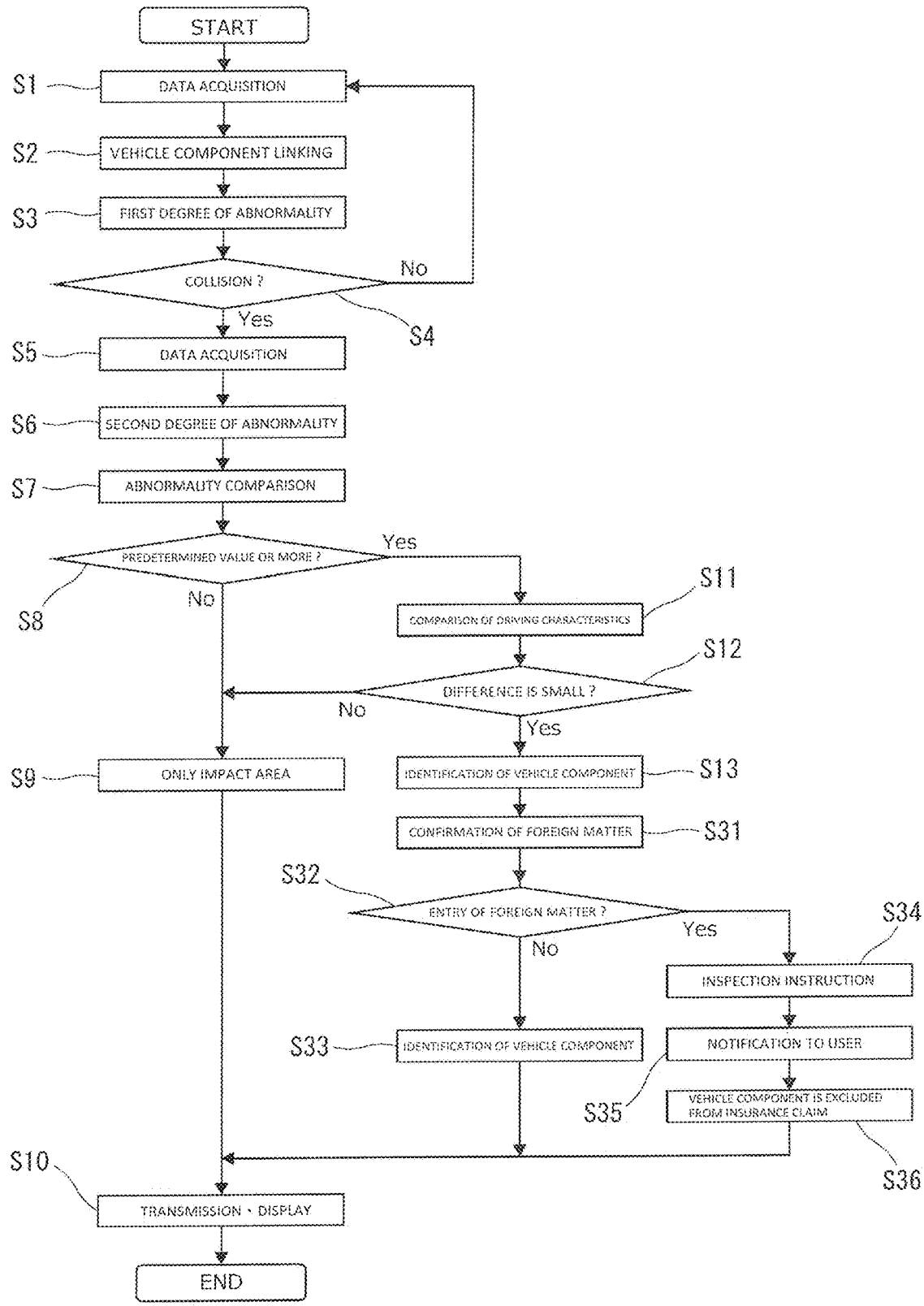
FIG. 10 is a flow chart illustrating a process flow according to the third embodiment.

Next, FIG. 10 is a flow chart illustrating a process flow executed in the vehicle data analysis device according to the third embodiment. The flow chart is the same as that of the first embodiment except for a process of confirming the entry of the foreign matter. First, various vehicle data are acquired (at step S1), and these vehicle data are linked (associated) with each vehicle component (at step S2). Next, the first degree of abnormality is determined for each vehicle component based on the vehicle data obtained at step S1 (at step S3).

Next, detection of a collision is performed at step S4. If the collision is detected, the routine proceeds to step S5, and the vehicle data is acquired during the self-travelling after the collision. If the vehicle is not capable of self-travelling, at step S5, instead of the acquisition of the vehicle data by the travelling, the post-collision vehicle data is acquired by the past accident data etc. from the vehicle information database 90. Then, at step S6, in the same manner as the calculation of the first degree of abnormality, the second degree of abnormality, which is the degree of abnormality after the collision, is determined for each vehicle component.

Subsequently, at step S7, the first degree of abnormality and the second degree of abnormality are compared with each other for each vehicle component. At step S8, a judgment is made as to whether or not there is a vehicle component whose second degree of abnormality is greater than whose first degree of abnormality by the predetermined value or more, i.e. a judgment is made as to whether or not there is a vehicle component whose difference between the first degree of abnormality and the second degree of abnormality is the threshold value or greater. If the judgment at step S8 is NO, the routine proceeds to step S9, and the failure component(s) (the damaged component(s)) is identified only from the collision point (the impact area). After that, the routine proceeds to step S10, and necessary information to be displayed (the component information, the behavior, the photograph, the sound data, etc. of the corresponding vehicle component(s) before and after the collision, etc.) is transmitted to the display unit 60, and is displayed on the display unit 60.

On the other hand, if the judgment at step S8 is YES, the routine proceeds to step S11 from step S8, and the driving characteristics at the time of the calculation of the first degree of abnormality and the driving characteristics at the time of the calculation of the second degree of abnormality are determined and compared with each other. Then, at step S12, a judgment is made as to whether or not a difference between these two driving characteristics is small. That is, a judgment is made as to whether or not there is intentional worsening (deterioration) of the second degree of abnormality.

If it is judged that the difference between the two driving characteristics is small at step S12, the routine proceeds to step S13 from step S12, and the vehicle component(s) whose second degree of abnormality is greater than whose first degree of abnormality by the predetermined value or more is temporarily identified as the vehicle component(s) which is outside the impact area, but has been affected in terms of deterioration or internal damage.

In the third embodiment, next, the routine proceeds to step S31, and the presence or absence of the entry of the foreign matter is confirmed for each vehicle component.

Then, at step S32, a judgment is made as to whether or not there is a vehicle component whose second degree of abnormality is greater than whose first degree of abnormality by the predetermined value or more and also where the entry of the foreign matter has been detected. If NO, the routine proceeds to step S33, and the vehicle component(s) whose second degree of abnormality is greater than whose first degree of abnormality by the predetermined value or more is finally identified as the vehicle component(s) which is outside the impact area, but has been affected in terms of deterioration or internal damage. After that, the routine proceeds to step S10, and necessary information to be displayed (the component information, the behavior, the photograph, the sound data, etc. of the corresponding vehicle component(s) before and after the collision, etc.) is transmitted to the display unit 60, and is displayed on the display unit 60. The display in this case is similar to those shown in FIGS. 3 and 4.

On the other hand, if it is judged that there is a vehicle component whose second degree of abnormality is greater than whose first degree of abnormality by the predetermined value or more and also where the entry of the foreign matter has been detected at step S32, the routine proceeds to step S34, and an instruction of inspection and removal of the foreign matter is given to the repair shop (e.g. the dealer), and at step S35, a notification that the user refrains from driving the vehicle is given to the user. Then, at step S36, the vehicle component where the entry of the foreign matter has been detected is excluded from objects of the insurance claim, and the vehicle component(s) whose second degree of abnormality is greater than whose first degree of abnormality by the predetermined value or more is finally identified as the vehicle component(s) which is outside the impact area, but has been affected in terms of deterioration or internal damage. Finally, at step S10, necessary information to be displayed (the component information, the behavior, the photograph, the sound data, etc. of the corresponding vehicle component(s) before and after the collision, etc.) is transmitted to the display unit 60, and is displayed on the display unit 60. In this case, these are displayed as shown in FIG. 11.

Although the embodiments of the present invention have been described above, the present invention is not limited to the above embodiments, and various modifications can be made. For instance, the example of the degree of abnormality of the suspension is merely one example for the purpose of description. In the present invention, the degree of abnormality may be grasped in any known form or manner.

The invention claimed is:

1. A vehicle data analysis method comprising:
   acquiring data, using a plurality of sensors, of a vehicle component during travel and based on this data, repeatedly calculating a degree of abnormality of the vehicle component which changes according to use of a vehicle as a first degree of abnormality, the plurality of sensors comprising an acceleration sensor, a pressure sensor, and a variation sensor;
   detecting a collision of the vehicle;
   by prediction of change of the degree of abnormality which has been calculated until a time of the collision, estimating a degree of abnormality of a case where the vehicle travels from the time of the collision to a certain time of comparison of the degree of abnormality, and setting this degree of abnormality as a first degree of abnormality;

acquiring data of the vehicle component after the collision during self-travelling of the vehicle after the collision, and based on this data, calculating a degree of abnormality of the vehicle component at the time of the comparison of the degree of abnormality, and setting this degree of abnormality as a second degree of abnormality;

comparing the first degree of abnormality and the second degree of abnormality, wherein changing driving characteristics is performed to correct a difference between degree of abnormalities based on the comparison between the first degree of abnormality and the second degree of abnormality.

2. The vehicle data analysis method as claimed in claim 1, wherein when the difference between the first degree of abnormality and the second degree of abnormality is a predetermined threshold value or greater, the vehicle component is considered as a vehicle component affected by the collision, and information on the vehicle component is output.

3. The vehicle data analysis method as claimed in claim 1, wherein the comparison between the first degree of abnormality and the second degree of abnormality is performed for each of a plurality of vehicle components.

4. The vehicle data analysis method as claimed in claim 1, wherein the first degree of abnormality and the second degree of abnormality are corrected by vehicle position data, weather data and driving characteristic data of a driver.

5. The vehicle data analysis method as claimed in claim 2, wherein driving characteristic data of a driver immediately before the collision and driving characteristic data of the driver after the collision are acquired, and when it is judged that there is an intentional driving characteristic change, the comparison between the first degree of abnormality and the second degree of abnormality or output of information on the vehicle component is not performed.

6. The vehicle data analysis method as claimed in claim 1, wherein data of a fastening torque of a fastening member that fixes the vehicle component is acquired, and a fastening torque after the collision is compared with a reference value.

7. The vehicle data analysis method as claimed in claim 6, wherein when the fastening torque after the collision is the reference value or less, a request for inspection is transmitted to a vehicle repair depot.

8. The vehicle data analysis method as claimed in claim 6, wherein when a difference between the first degree of abnormality and the second degree of abnormality is a predetermined threshold value or greater, the vehicle component is included in candidates for insurance claim, and
  when the fastening torque after the collision is the reference value or less, the vehicle component is excluded from the candidates for insurance claim.

9. The vehicle data analysis method as claimed in claim 6, wherein when the fastening torque after the collision is the reference value or less, a notification that a user of the vehicle refrains from travelling and has the vehicle inspected is given to the user.

10. The vehicle data analysis method as claimed in claim 1, wherein information about entry of foreign matter into the vehicle component due to the collision is acquired.

11. The vehicle data analysis method as claimed in claim 10, wherein when the entry of the foreign matter into the vehicle component is detected, a request for inspection is transmitted to a vehicle repair depot.

12. The vehicle data analysis method as claimed in claim 10, wherein when a difference between the first degree of abnormality and the second degree of abnormality is a predetermined threshold value or greater, the vehicle component is included in candidates for insurance claim, and
  when the entry of the foreign matter into the vehicle component is detected, the vehicle component is excluded from the candidates for insurance claim.

13. The vehicle data analysis method as claimed in claim 10, wherein when the entry of the foreign matter into the vehicle component is detected, a notification that a user of the vehicle refrains from travelling and has the vehicle inspected is given to the user.

14. The vehicle data analysis method as claimed in claim 1, wherein when the collision is detected, data at a time of the collision, information about conditions of an intended vehicle component before and after the collision and data that is a source of calculation of the second degree of abnormality are transmitted to at least any of a party concerned in insurance, a police official and a legal representative.

15. The vehicle data analysis method as claimed in claim 1, wherein a difference between the first degree of abnormality and the second degree of abnormality is determined for a plurality of vehicle components, and
  the components are displayed in order of the largest difference on a display unit.

16. The vehicle data analysis method as claimed in claim 1, wherein a vehicle component whose difference between the first degree of abnormality and the second degree of abnormality is a predetermined threshold value or greater is extracted from among a plurality of vehicle components,
  information about the collision is acquired, and based on this information, a vehicle component on which collision energy would have been directly exerted and a vehicle component on which the collision energy would have been indirectly exerted are classified, and
  the both components are displayed separately on a display unit.

17. The vehicle data analysis method as claimed in claim 1, wherein an appropriate maintenance course for a vehicle component whose difference between the first degree of abnormality and the second degree of abnormality is a predetermined threshold value or greater is determined,
  an approximate repair price is calculated along this maintenance course, and these maintenance course and approximate repair price are displayed on a display unit.

18. The vehicle data analysis method as claimed in claim 1, wherein driving characteristic data of a driver immediately before the collision and driving characteristic data of the driver after the collision are acquired, and when it is judged that there is an intentional driving characteristic change, a corresponding travel section is displayed on a display unit.

19. A vehicle data analysis device comprising:
  a plurality of sensors configured to, during travel, acquire data that is a source of calculation of a degree of abnormality of a vehicle component, the plurality of sensors comprising an acceleration sensor, a pressure sensor, and a variation sensor; and
  a vehicle-mounted computer configured to:
  detect a collision of a vehicle;
  for an intended vehicle component, by prediction of change of the degree of abnormality which has been calculated until a time of the collision, estimate a degree of abnormality of a case where the vehicle travels from the time of the collision to a certain time of comparison of the degree of abnormality, and set this degree of abnormality as a first degree of abnormality, and also, based on data acquired during self-travelling of the vehicle after the collision, calculate a degree of abnormality at the time of the comparison of the degree of abnormality, and set this degree of abnormality as a second degree of abnormality after the collision;

compare the first degree of abnormality and the second degree of abnormality, wherein changing driving characteristics is performed to correct a difference between degree of abnormalities based on the comparison between the first degree of abnormality and the second degree of abnormality.

20. A vehicle data analysis method comprising:

acquiring data, using a plurality of sensors, of a vehicle component during travel before a collision, and determining, based on this data, a degree of abnormality of the vehicle component as a first degree of abnormality, the plurality of sensors comprising an acceleration sensor, a pressure sensor, and a variation sensor;

detecting a collision of a vehicle;

determining a degree of abnormality of the vehicle component after the collision as a second degree of abnormality;

comparing the first degree of abnormality and the second degree of abnormality;

when a difference between the first degree of abnormality and the second degree of abnormality is a predetermined threshold value or greater, the vehicle component is included in candidates for insurance claim;

further acquiring information about the vehicle component; and when information of at least a part of the vehicle components applies to a predetermined abnormality, the vehicle component is excluded from the candidates for insurance claim, wherein changing driving characteristics is performed to correct the difference between degree of abnormalities based on the comparison between the first degree of abnormality and the second degree of abnormality.

21. The vehicle data analysis method as claimed in claim 20, wherein the predetermined abnormality is an abnormality that is resolved by carrying out repair not requiring replacement of the vehicle component.

22. The vehicle data analysis method as claimed in claim 21, wherein data of a fastening torque of a fastening member that fixes the vehicle component is acquired, and a fastening torque after the collision is compared with a reference value.

23. The vehicle data analysis method as claimed in claim 22, wherein when the fastening torque after the collision is the reference value or less, a request for inspection is transmitted to a vehicle repair depot.

24. The vehicle data analysis method as claimed in claim 22, wherein when the fastening torque after the collision is the reference value or less, the vehicle component is excluded from the candidates for insurance claim.

25. The vehicle data analysis method as claimed in claim 22, wherein when the fastening torque after the collision is the reference value or less, a notification that a user of the vehicle refrains from travelling and has the vehicle inspected is given to the user.

26. The vehicle data analysis method as claimed in claim 21, wherein information about entry of foreign matter into the vehicle component due to the collision is acquired.

27. The vehicle data analysis method as claimed in claim 26, wherein when the entry of the foreign matter into the vehicle component is detected, a request for inspection is transmitted to a vehicle repair depot.

28. The vehicle data analysis method as claimed in claim 26, wherein when the entry of the foreign matter into the vehicle component is detected, the vehicle component is excluded from the candidates for insurance claim.

29. The vehicle data analysis method as claimed in claim 26, wherein when the entry of the foreign matter into the vehicle component is detected, a notification that a user of the vehicle refrains from travelling and has the vehicle inspected is given to the user.

30. The vehicle data analysis method as claimed in claim 1 further comprising:

suppressing traveling of the vehicle with a loose fastening member based on the degree of abnormality and a comparison between the fastening torque and a predetermined threshold.

31. The vehicle data analysis method as claimed in claim 1 further comprising:

suppressing traveling of the vehicle with a foreign object present in the vehicle component based on the degree of abnormality and a foreign matter entry detection.

* * * * *